United States Patent [19]
Cranson et al.

[11] Patent Number: 5,793,574
[45] Date of Patent: Aug. 11, 1998

[54] TAPE HEAD ACTUATOR ASSEMBLY HAVING A SHOCK SUPPRESSION SLEEVE

[75] Inventors: Kenneth G. Cranson, Sterling; Robert L. Harrison, Norwell; Keith L. Daly, Shrewsbury, all of Mass.

[73] Assignee: Quantum Corporation, Milpitas, Calif.

[21] Appl. No.: 711,618

[22] Filed: Sep. 10, 1996

[51] Int. Cl.⁶ .................... G11B 5/55; G11B 21/02; F16H 55/18
[52] U.S. Cl. ............. 360/106; 360/78.02; 360/109; 74/424.8 A; 74/441
[58] Field of Search ................... 360/106, 109, 360/77.12, 78.02; 74/89.15, 409, 424.8 A, 424.8 R, 440, 441

[56] References Cited

U.S. PATENT DOCUMENTS

| | | | |
|---|---|---|---|
| Re. 32,433 | 6/1987 | Erikson et al. | 74/441 |
| 4,249,426 | 2/1981 | Erikson et al. | 74/441 |
| 4,434,677 | 3/1984 | Linley, Jr. | 74/409 |
| 4,750,067 | 6/1988 | Gerfast | 360/106 |
| 4,833,558 | 5/1989 | Baheri | 360/106 |
| 4,872,795 | 10/1989 | Davis | 74/441 |
| 5,027,671 | 7/1991 | Erikson et al. | 74/441 |
| 5,303,606 | 4/1994 | Kokinda | 74/441 |
| 5,448,438 | 9/1995 | Kassety | 360/106 |
| 5,537,275 | 7/1996 | Peace et al. | 360/106 |
| 5,644,453 | 7/1997 | Eckberg et al. | 360/106 |

Primary Examiner—Stuart S. Levy
Assistant Examiner—David L. Ometz
Attorney, Agent, or Firm—David B. Harrison; Debra A. Chun; Robert V. Klauzinski

[57] ABSTRACT

A magnetic tape head actuator assembly has a stepper motor having a threaded output shaft and a bracket for supporting a tape head assembly. The bracket includes a pair of outwardly extending flanges. The flanges each have a bore, whereby the bores are axially aligned and dimensioned to accept the output shaft therethrough. The bracket further has an integral platform portion oriented normal to the threaded output shaft for mounting a tape head assembly. A threaded split nut positioned intermediate the bores is rigidly attached to the bracket and engages the threaded output shaft for movement of the bracket back and forth along the shaft. The nut further has an annular groove encircling its outer perimeter, wherein a circular spring positioned therein provides an inwardly directed compressive force on the nut. A unitary shock suppression sleeve that has a hollow interior portion dimensioned to accept the output shaft of the stepper motor provides an expansion resistant force on the split nut during atypical mechanical shock impacts. Moreover, the shock sleeve is spring biased to adaptively engage the split nut over a reasonable live span of the nut. In the event of a mechanical shock impact, a ramped interior portion of the sleeve provides a reactionary force on the nut for resisting the expansion thereof, thus substantially eliminating, split nut backlash.

19 Claims, 8 Drawing Sheets

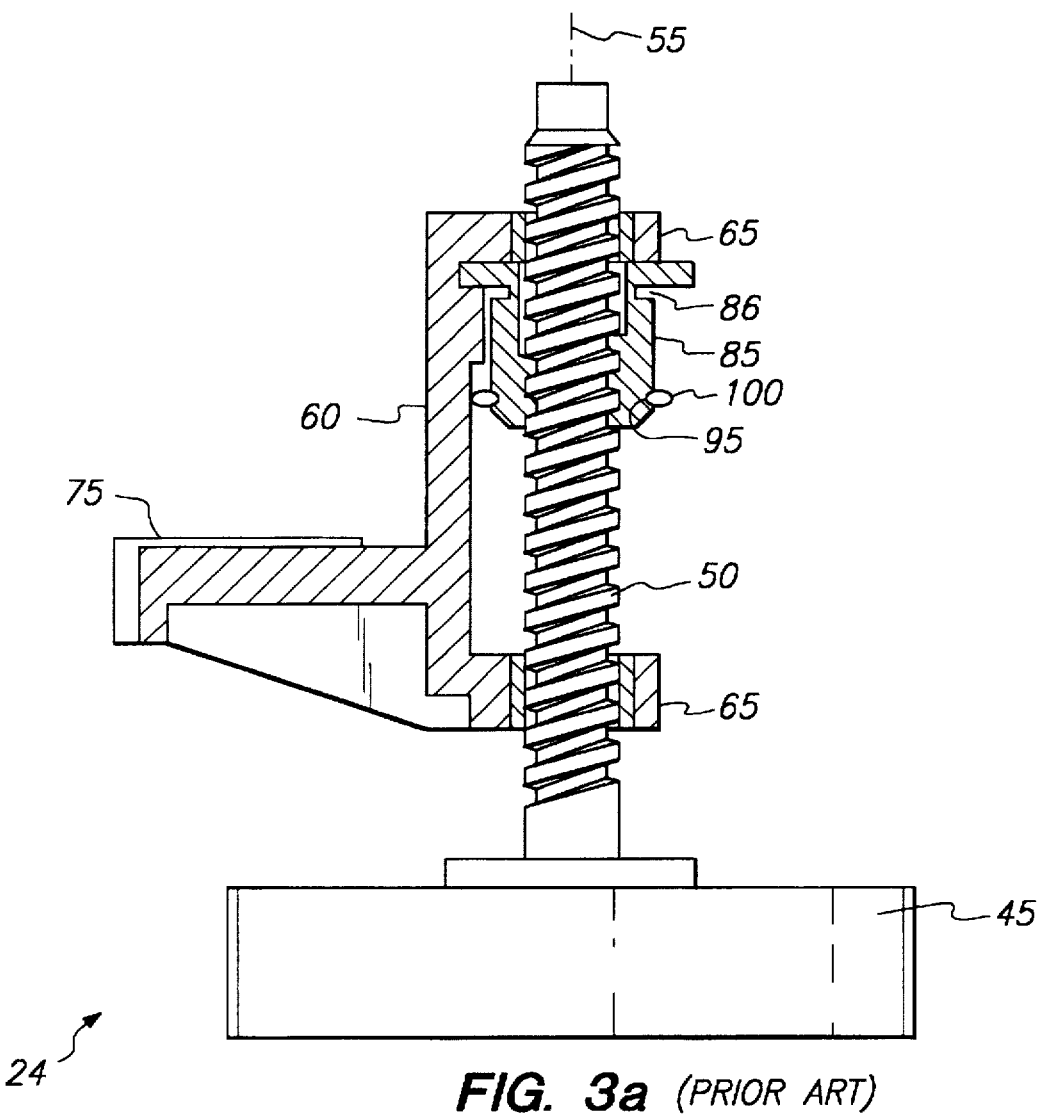
FIG. 3a (PRIOR ART)
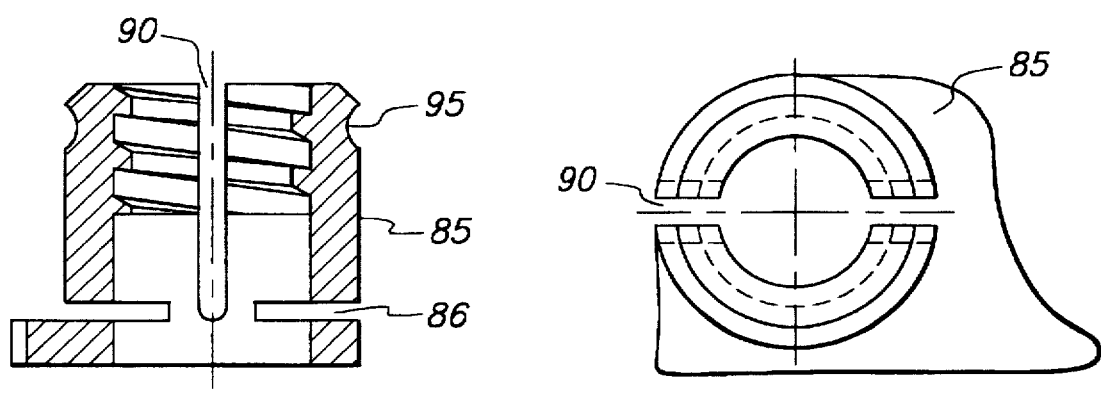
FIG. 3b (PRIOR ART)
FIG. 3c (PRIOR ART)

5,793,574

TAPE HEAD ACTUATOR ASSEMBLY HAVING A SHOCK SUPPRESSION SLEEVE

CROSS-REFERENCE TO RELATED PATENTS

This invention relates to the following patent which is assigned to the assignee of this application as of the date of filing: U.S. Pat. No. 5,448,438, entitled: "Head Actuator Having Spring Loaded Split Nut" to Kasetty.

FIELD OF THE INVENTION

The invention relates generally to a magnetic tape head actuator assembly, and more precisely to a unitary shock suppression sleeve for substantially eliminating actuator play or backlash.

BACKGROUND OF THE INVENTION

In one pertinent form, a tape drive is generally comprised of a rectangular housing that has a common base. The base has two spindle motors. The first spindle motor has a permanently mounted spool dimensioned to accept a relatively high speed streaming magnetic tape. The second spindle is adapted to accept a removable tape cartridge. The removable tape cartridge is manually or automatically inserted into the drive via a slot formed on the drive's housing. Upon insertion of the tape cartridge into the slot, the cartridge engages the second spindle motor. Prior to rotation of the first and second spindle motors, the tape cartridge is connected to the permanently mounted spool by means of a mechanical buckling mechanism. A number of rollers positioned intermediate the tape cartridge and the permanent spool guide the magnetic tape as it traverses at relatively high speeds back and forth between the tape cartridge and the permanently mounted spool.

By way of example, and as shown in FIG. 1, a conventional tape drive 5, includes a first spindle motor 10a adapted for accepting a permanently mounted take-up spool 15, and a second motor 10b adapted for accepting a removable tape cartridge 20. The tape drive 5 further comprises a tape head actuator assembly 25 positioned intermediate the take-up spool 15 and the tape cartridge 20 along a tape path 30 defined by a plurality of rollers 35. During operation, the magnetic tape 40 streams back and forth between the take-up spool 15 and the tape cartridge 20, coming into close proximity to the head actuator assembly 25 while streaming a long the defined tape path 30.

Referring to FIGS. 2 and 3a, b, and c, a magnetic tape head actuator assembly 25 is shown and described in commonly owned U.S. Pat. No. 5,448,438, entitled: "Head Actuator Having Spring Loaded Split Nut" to Kasetty, the disclosure thereof being incorporated herein by reference. The actuator assembly 25 comprises a stepper motor 45 having a threaded output shaft 50 having a central rotational axis 55. The tape head actuator assembly 25 further includes a head mounting bracket 60 engaging the output shaft 50 for moving the bracket 60 back and forth along the central axis 55 thereof. More precisely, the bracket 60 includes a pair of outwardly extending flanges 65. The flanges 65 each have a bore 70, whereby the bores 70 are axially aligned and dimensioned to accept the output shaft 50 therethrough. The bracket 60 further comprises a platform portion 75 oriented normal to t he threaded output shaft 50 for mounting a tape head assembly 80. The actuator assembly operates to index a magnetic tape head in a direction orthogonal to the direction of travel of the streaming tape. As the streaming magnetic tape traverses back and forth, the tape head is indexed accordingly to read/write a multiplicity of data tracks thereon.

A threaded split nut 85 having a pair of splits 90 oriented parallel to the central axis 55 and circumferentially spaced 180-degrees apart, is positioned intermediate the bores 70. The nut 85 is rigidly attached to the bracket 60 and engages the threaded output shaft 50 for movement of the bracket 60 back and forth along the shaft 50. The nut 85 further has an annular groove 95 formed on its outer periphery, wherein an elastic member 100 such as a circular spring 100 positioned therein provides an inwardly directed adaptive compressive force on the nut 85. In order to ease the deformation of the nut 85, the nut 85 may further include an annular space 86 oriented normal the central axis 55.

Thus, when the actuator assembly output shaft rotates in either a clockwise or counterclockwise direction, the bracket and head assembly mounted thereon will move back and forth along the shaft in correspondence to the output shaft rotation.

One principle limitation of coupling an actuator bracket to a threaded output shaft by means of a split nut as previously described is the nut's susceptibility to mechanical shock impacts resulting in backlash. In particular, as tape head assemblies become increasing complex, e.g., by adding head tilting motors and larger multi-channel heads, the mass of the tape head assembly will proportionally increase. Since the tape head assembly is mounted on the actuator mounting bracket, which is principally supported by the threads of the split nut, the increased mass will cause an increase in the torque and inertia exerted on the split nut. The increased forces exerted on the nut may substantially contribute to the nut overcoming the compressive force of the circular spring resulting in undesirable expansion thereof. The expansion of the split nut may cause the actuator bracket to move orthogonal to the data tracks of a streaming magnetic tape in a non-predictable manner resulting in catastrophic data error during write operations of the tape head assembly.

One solution to the aforementioned increase in mass of tape head assemblies is to increase the spring force of the circular spring, which provides the compressive force for the split nut. However, during normal operation (absent atypical mechanical shock impact) the increased spring force may result in premature wear of the nut.

Thus, a hitherto unsolved need has remained for a mechanism of providing a magnetic tape head actuator assembly having a unitary shock suppression sleeve for substantially eliminating actuator backlash.

SUMMARY OF THE INVENTION

An object of the present invention is to set forth an improved magnetic tape head actuator assembly which overcomes limitations and drawbacks of previous approaches.

Another object of the present invention is to set forth a magnetic tape head actuator assembly that is resistant to backlash due to mechanical shock impacts, or loose play from wear or mechanical tolerances.

Yet another object of the present invention is to set forth a magnetic tape head actuator assembly that maintains accurate data track positioning.

In accordance with principles of the present invention, a magnetic tape head actuator assembly for precisely positioning a tape head along the data tracks of a streaming magnetic tape is set forth.

Generally, a rotatable threaded shaft engages a head actuator mounting bracket for moving the bracket back and forth along the shaft. The bracket includes a pair of integral flanges extending outwardly from a central portion. The flanges each have a bore, whereby the bores are axially aligned and dimensioned to accept the threaded shaft therethrough. The interior circumferential portion of the bores may be lined with a wear resistant material. The bracket further comprises an integral platform portion oriented normal to the threaded output shaft for mounting a tape head assembly.

A threaded split nut positioned intermediate the bores is rigidly attached to the bracket and has threaded segments engaging the threaded output shaft for transferring shaft movement to the bracket. The nut further has an annular groove encircling an outer perimeter at the threaded segments. A circular compression spring in the groove provides an inwardly directed compressive force to urge the threaded segments towards the threaded shaft.

A unitary shock suppression sleeve has a hollow interior portion dimensioned to accept the shaft and to engage the threaded segments of the split nut. The sleeve is spring biased to adaptively bear against the split nut. In the event of a mechanical shock impact, the ramped interior portion of the sleeve provides a reactionary force to the threaded segments for resisting the expansion thereof, thus substantially eliminating split nut backlash. The reactionary force may be applied by the sleeve directly to the split segments or more preferably through the circular compression spring.

These and other objects, advantages, aspects and features of the present invention will be more fully understood and appreciated upon consideration of the following detailed description of a preferred embodiment, presented in conjunction with the accompanying drawings.

BRIEF DESCRIPTION OF THE DRAWINGS

In the drawings:

FIG. 3 (a) is a side elevation view, partly in section, of the FIG. 2 tape drive head actuator.

FIG. 3 (b) is a side elevation sectional view of a split nut.

FIG. 3 (c) is a plan view of the split nut shown in FIG. 2.

FIG. 5 (b) is a side elevation sectional view of the FIG. 5 (a) shock suppression sleeve.

FIG. 6 (b) is a side plan view of the FIGS. 4 and 5 shock suppression sleeve.

DETAILED DESCRIPTION OF A THE PREFERRED EMBODIMENT

Figure 1:
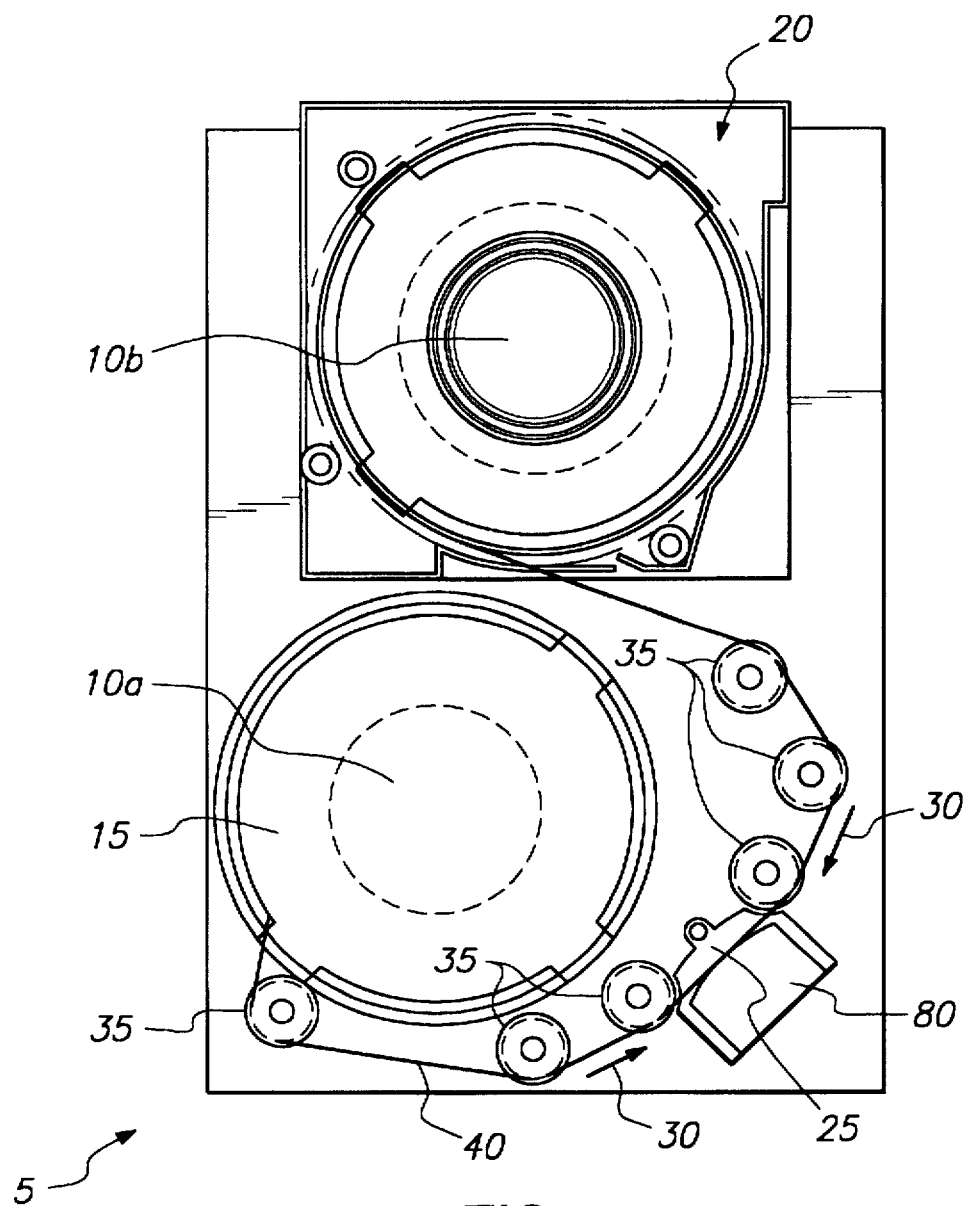
FIG. 1 is a plan view of a conventional magnetic tape drive.
Figure 2:
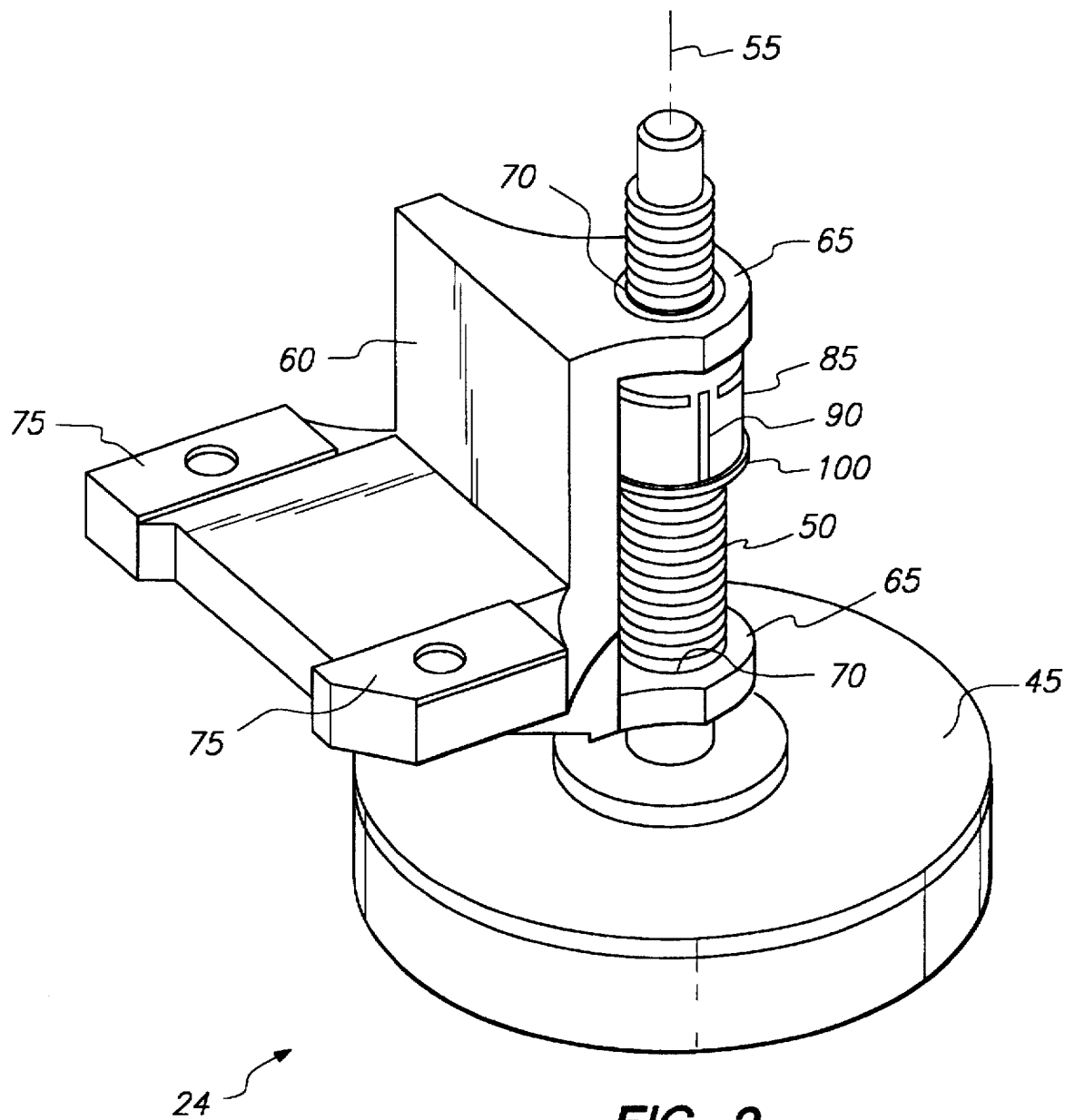
FIG. 2 is an enlarged isometric view of the prior art tape head actuator assembly used in the FIG. 1 tape drive.
Figure 4:
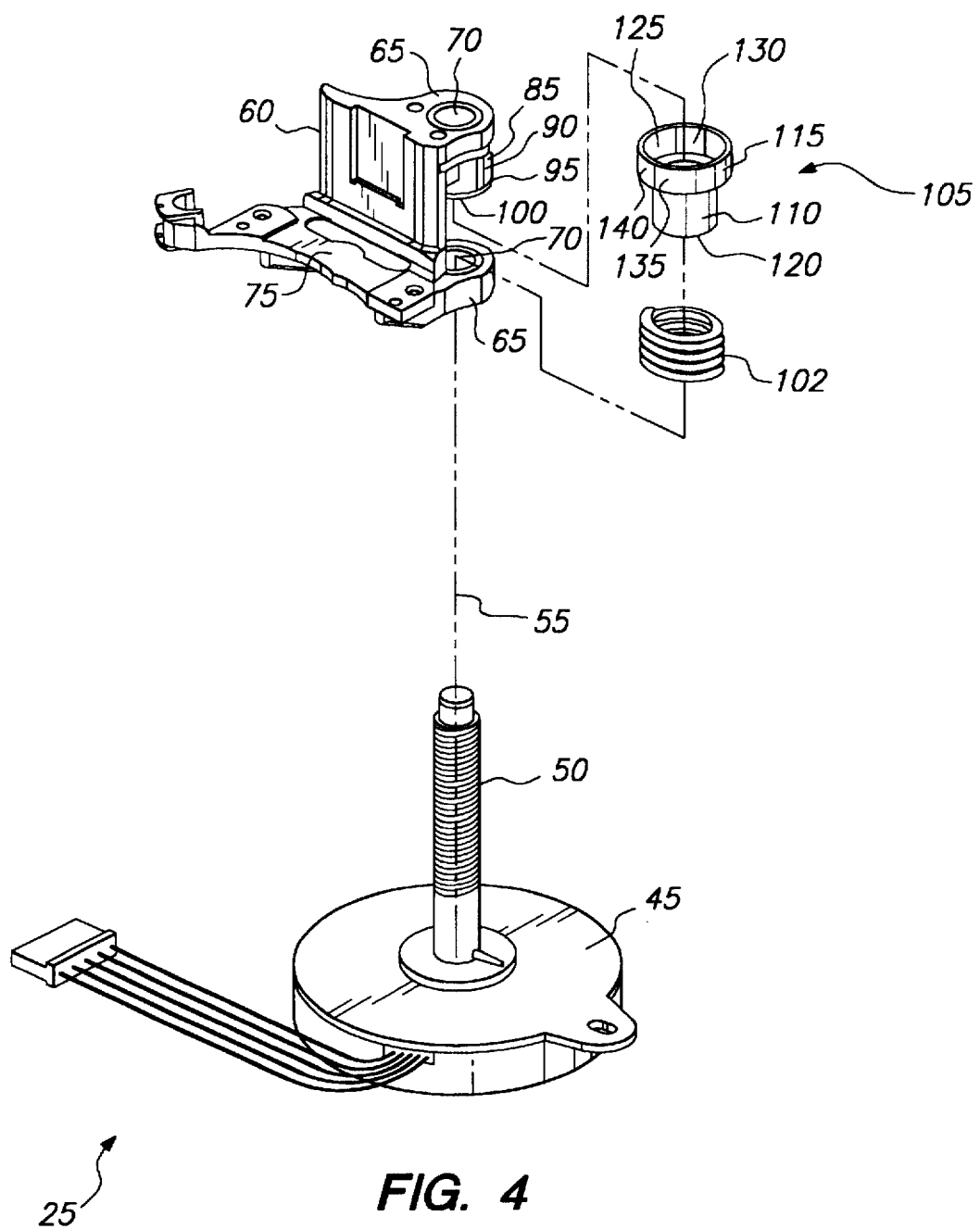
FIG. 4 is an isometric view of the tape head actuator assembly having principles of the present invention.
Figure 5A:
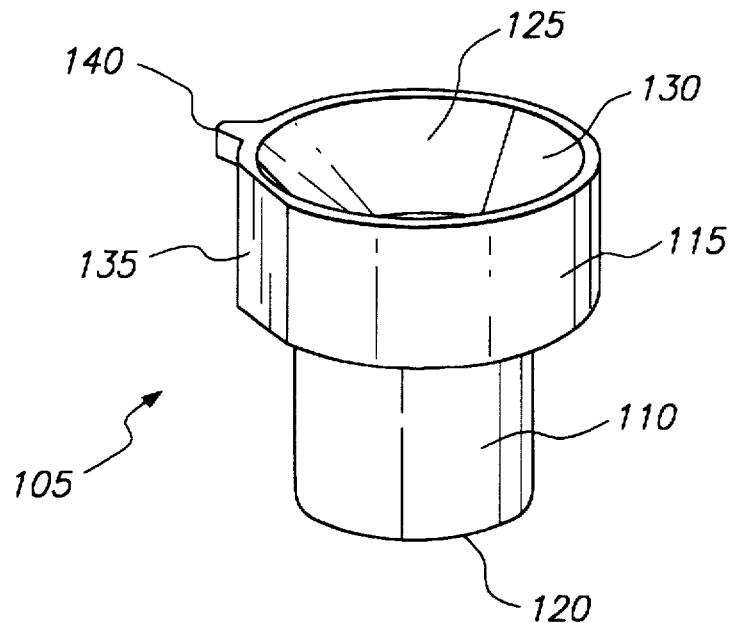
FIG. 5 (a) is an isometric view of the shock suppression sleeve shown in FIG. 4.
Figure 5B:
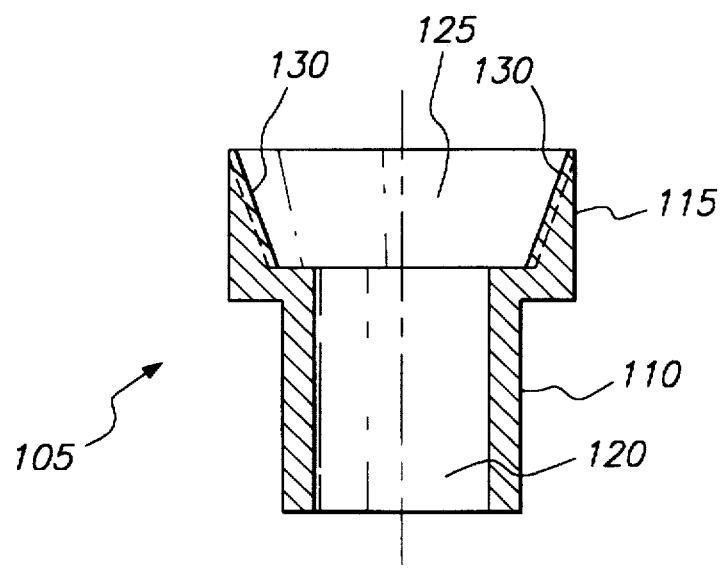
Figure 6A:
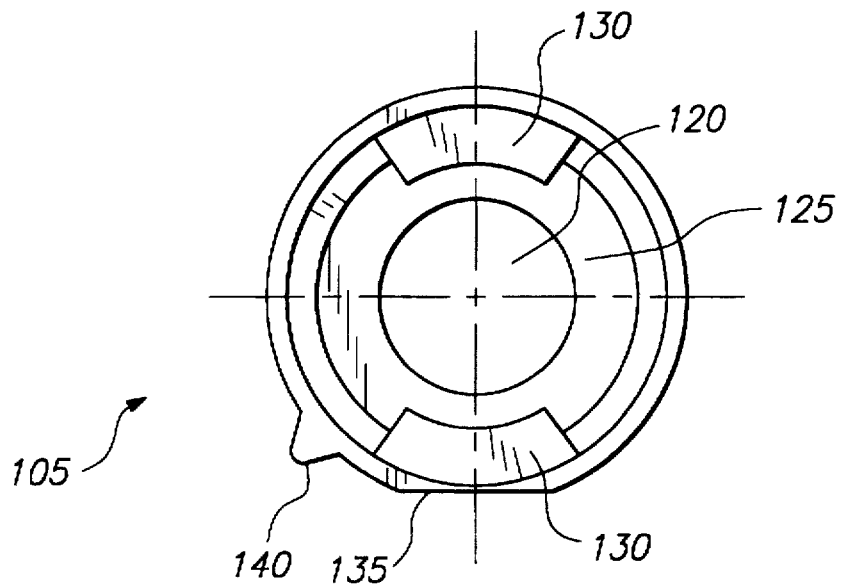
FIG. 6 (a) is a top plan view of the FIGS. 4 and 5 shock suppression sleeve.
Figure 6B:
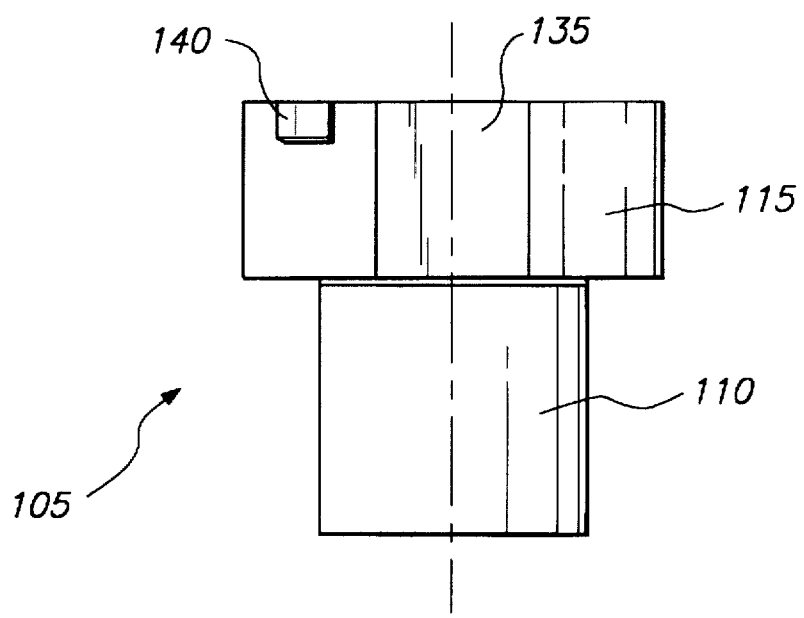

Referring to FIGS. 4, 5a, b, and 6a, b, a magnetic tape head actuator assembly 25 in accordance with principles of the present invention, comprises a unitary shock suppression sleeve 105 that has a first portion 110 and a second portion 115 coaxially aligned with the first portion. The first portion 110 has a hollow cylindrical cavity 120 for closely conforming to the stepper motor output shaft 50 inserted therethrough. The second portion 115 of the sleeve 105 has a radially expanded hollow interior cavity defining a cup 125, whereby the cup 125 is dimensioned to substantially conform to the split nut 85. A linear biasing helical spring 102 exerts an upwardly directed force against the second portion 115 of the cup 125 and thus forces the unitary sleeve 105 to adaptively maintain a contact relationship with the split nut 85. The ramped portions 130 of the cup 125 contacting the split nut 85, in conjunction with the biasing force exerted on the cup 125 by spring 102, maintains the sleeve 105 in an axially aligned position. Therefore, as the ramps 130 progressively engage the split nut 85 an inherent axial alignment is maintained between the shock suppression sleeve 105 and the central axis of the tape head actuator assembly 25.

The hollow interior portion of the cup 125 has a pair of oppositely positioned ramps 130 formed on the interior walls thereof. The ramps 130 begin at the top edge of the cup 125 and uniformly increase in height as the ramps 130 traverse downwardly into the cup 125. One preferred ramp cross-section angle is seventeen degrees.

Figure 7:
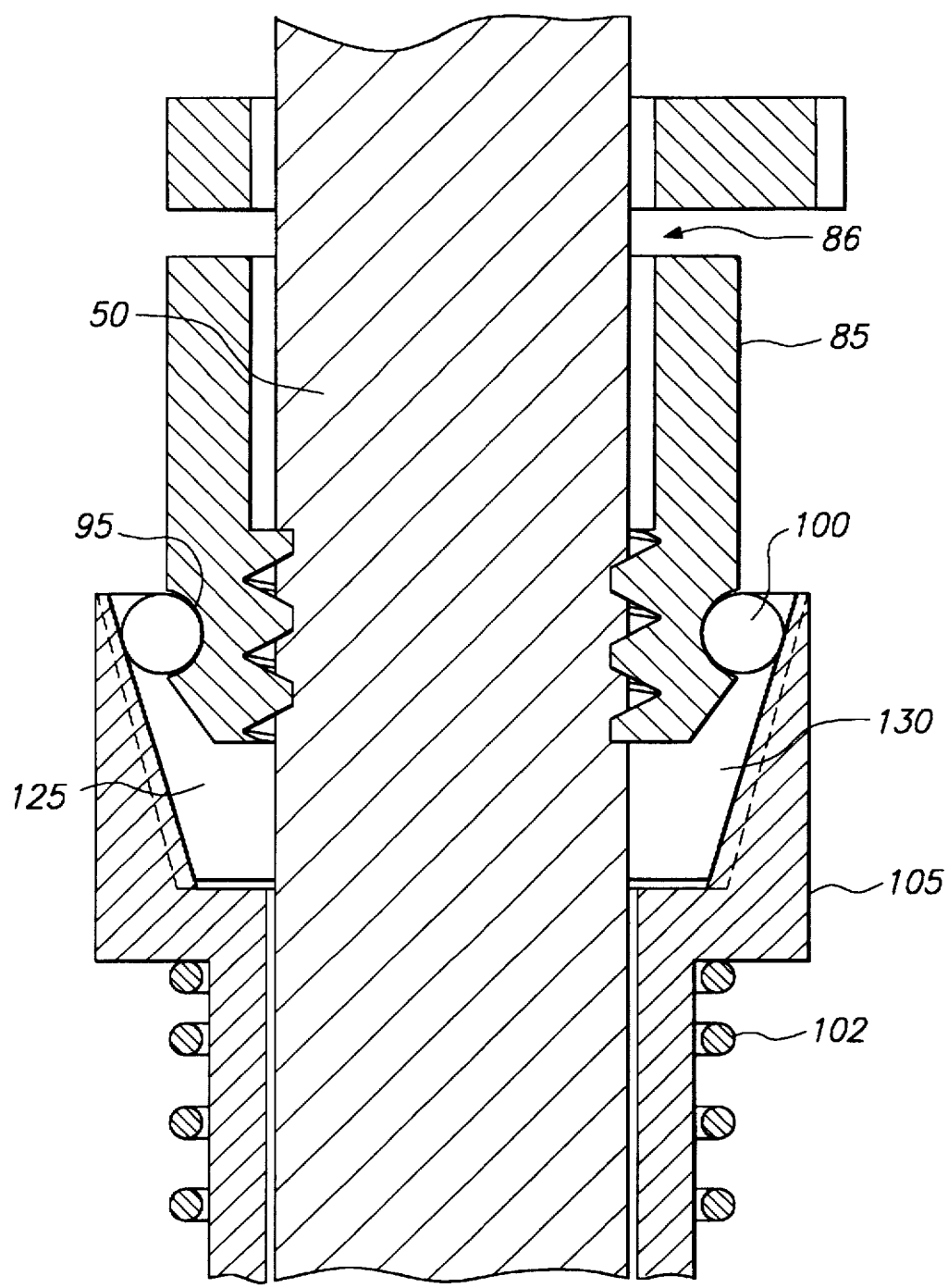
FIG. 7 is an assembly view of one preferred embodiment of the shock suppression sleeve of the present invention.

In one preferred embodiment of the present invention shown in FIG. 7, the ramped portions 130 of the cup 125 contact the circular spring 100 of the split nut 85 and exert an axial force thereon. In the event of an atypical mechanical shock impact, which would otherwise cause the split nut 85 to overcome the compressive force of the circular spring 100 and expand, the ramps 130 provide a reactionary expansion resistant force on the split nut 85. Further, the ramped portions 130 of the cup may be positioned 90-degrees from the splits 90 on the nut 85 such as to maximize the shock impact reactionary forces exerted on the nut 85. In order to maintain the sleeve 105 in such a position, a substantially planar datum surface 135 in conjunction with a datum protrusion 140 is formed on the exterior portion of the cup 125 (see FIG. 5a). The planar portion 135 cooperates with a complimentary planar groove (not shown) formed on the actuator bracket 60 for maintaining the sleeve in a predetermined radial position. Moreover, the datum protrusion interlocks with a raised rib portion (not shown) integral with the bracket 60 for insuring that the sleeve's radial position remains substantially constant. Collectively, the planar datum surface 135 and datum protrusion 140 secure the unitary shock sleeve 105 in position to maximize expansion resistant forces on the nut 85.

Figure 8:
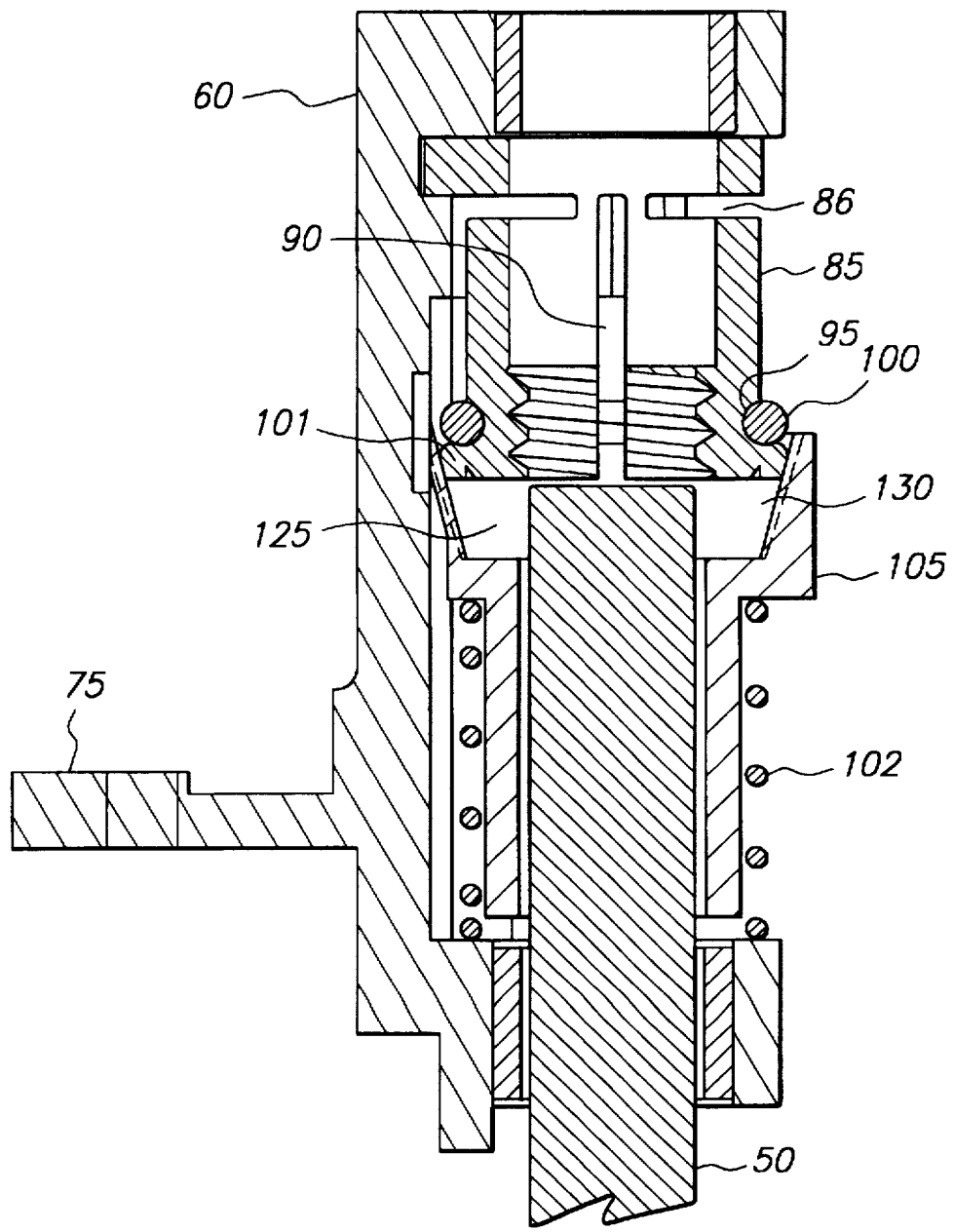
FIG. 8 is an assembly view of another preferred embodiment of the shock suppression sleeve of the present invention.

In an alternative embodiment of the present invention shown in FIG. 8, the ramps 130 contact a pair of bumps 101 formed on the split nut 85 and exert an axial force thereon. During use, the ramps 130 will provide a reactionary expansion-resistant force against the bumps 101, thereby resisting expansion of the split nut 85 in a like manner to that previously described.

Therefore, in the event of an atypical mechanical shock impact, the tape head actuator assembly 25 having a shock suppression sleeve 105 of the present invention, provides a reactionary force on the split nut 85 for resisting the expansion thereof, thus substantially eliminating split nut 85 backlash or loose play.

Having thus described an embodiment of the invention, it will now be appreciated that the objects of the invention have been fully achieved, and it will be understood by those skilled in the art that many changes in construction and widely differing embodiments and applications of the invention will suggest themselves without departing from the spirit and scope of the invention. The disclosure and the description herein are purely illustrative and are not intended to be in any sense limiting.

What is claimed is:

1. A tape head actuator, comprising:

a rotatable threaded shaft;

a tape head actuator mounting bracket for mounting a tape head, the actuator mounting bracket having (i) an axially aligned bore for accepting the threaded shaft and (ii) a threaded split nut having threaded segments for engaging the threads of the shaft;

an elastic compression member disposed in an annular groove formed on the periphery of the threaded segments, the elastic compression member urging the segments against the shaft;

a shock suppression sleeve having (i) a hollow cylindrical cavity for receiving the shaft therethrough, and (ii) a cup with a generally conical hollow interior cavity dimensioned to substantially conform to fit over the threaded segments of the split nut;

a pair of generally conical ramps formed on interior walls of the cup, the ramps exerting a uniform axial force on the elastic compression member; and an axial bias force means for forcing the cup to contact the threaded segments.

2. The tape head actuator of claim 1, wherein the shock suppression sleeve is formed such that structure defining the cavity is coaxial with structure forming the cup.

3. The tape head actuator of claim 1, wherein the ramps begin at a top edge of the cup and uniformly increase in height as the ramps traverse downwardly into the cup defining a ramp angle.

4. The tape head actuator of claim 3, wherein the ramp angle is approximately seventeen degrees.

5. The tape head actuator of claim 1, wherein the ramps provide a reactionary expansion resistant force on the split nut during atypical mechanical impact shocks.

6. The tape head actuator of claim 5, wherein the ramps are positioned 90-degrees from splits on the split nut such as to maximize the shock impact reactionary forces exerted on the split nut.

7. The tape head actuator of claim 1, wherein the cup further comprises a substantially planar datum surface formed on an exterior thereof that cooperates with a complimentary planar groove formed on the actuator mounting bracket for maintaining the sleeve in a static relationship with respect to the bracket.

8. The tape head actuator of claim 1, wherein the cup further comprises a datum protrusion formed on the exterior thereof that cooperates with a raised rib portion formed on the actuator mounting bracket for maintaining the sleeve in a static relationship with respect to the bracket.

9. The tape head actuator of claim 1, wherein the ramps of the cup progressively engage the split nut, thereby maintaining the sleeve in an axially aligned position.

10. A tape head actuator assembly comprising:

a rotatable threaded shaft;

an actuator mounting bracket having a pair of flanges with axially aligned bores for accepting the threaded shaft, the bracket further comprising a substantially planar portion oriented normal to the threaded shaft for mounting a tape head assembly thereon;

a threaded split nut positioned intermediate the flanges includes threaded segments for engaging the threads of the shaft so that shaft rotation is transferred through the nut to move the bracket linearly along the shaft;

an annular groove formed on the periphery of the threaded segments;

an elastic compression member in the groove for exerting a compressive force to urge the segments against the shaft;

a shock suppression sleeve having a first portion and a second portion, the first portion having a hollow cylindrical cavity for receiving the shaft therethrough, the second portion forming a cup with a generally conical hollow interior cavity dimensioned to substantially conform to fit over the threaded segments of the split nut;

a pair of generally conical ramps formed on interior walls of the cup, the ramps exerting a uniform axial force on the elastic compression member; and an axial bias force means to force the cup against the threaded segments.

11. The tape head actuator of claim 10, wherein the shock suppression sleeve is formed such that structure defining the cavity is coaxial with structure forming the cup.

12. The tape head actuator of claim 10, wherein the ramps begin at a top edge of the cup and uniformly increase in height as the ramps traverse downwardly into the cup defining a ramp angle.

13. The tape head actuator of claim 12, wherein the ramp angle is approximately seventeen degrees.

14. The tape head actuator of claim 10, wherein the ramps provide a reactionary expansion resistant force on the split nut during atypical mechanical impact shocks.

15. The tape head actuator of claim 14, wherein the ramps are positioned 90-degrees from splits on the split nut such as to maximize the shock impact reactionary forces exerted on the split nut.

16. The tape head actuator of claim 10, wherein the cup further comprises a substantially planar datum surface formed on an exterior thereof that cooperates with a complimentary planar groove formed on the actuator mounting bracket for maintaining the sleeve in a static relationship with respect to the bracket.

17. The tape head actuator of claim 10, wherein the cup further comprises a datum protrusion formed on the exterior thereof that cooperates with a raised rib portion formed on the actuator mounting bracket for maintaining the sleeve in a static relationship with respect to the bracket.

18. The tape head actuator of claim 10, wherein the ramps of the cup progressively engage the split nut, thereby maintaining the sleeve in an axially aligned position.

19. A tape head actuator, comprising:

a rotatable threaded shaft;

a tape head actuator mounting bracket for mounting a tape head, the actuator mounting bracket having (i) an axially aligned bore for accepting the threaded shaft and (ii) a threaded split nut having threaded segments for engaging the threads of the shaft;

an elastic compression member disposed in an annular groove formed on the periphery of the threaded segments, the elastic compression member urging the segments against the shaft;

a shock suppression sleeve having (i) a hollow cylindrical cavity for receiving the shaft therethrough, and (ii) a cup with a generally conical hollow interior cavity dimensioned to substantially conform to fit over the threaded segments of the split nut;

a pair of bumps formed on the split nut;

a pair of generally conical ramps formed on interior walls of the cup, the ramps exerting a uniform axial force on the bumps; and an axial bias force means for forcing the cup to contact the threaded segments.

* * * * *